United States Patent

Metzger, Jr.

[15] 3,689,499

[45] Sept. 5, 1972

[54] METHOD FOR PREPARING IMINOOXAZOLIDINES FROM GUANIDINES

[72] Inventor: Sidney H. Metzger, Jr., Franz-Hitzenstrasse 28, 509 Leverkusen-Neuenhof, Germany

[22] Filed: Oct. 28, 1968

[21] Appl. No.: 771,364

Related U.S. Application Data

[63] Continuation-in-part of Ser. No. 402,951, Oct. 9, 1964, Pat. No. 3,594,387, and a continuation-in-part of Ser. No. 544,683, April 25, 1966, abandoned.

[52] U.S. Cl. ...... 260/307 F, 260/15.8 NZ, 260/340.2, 260/348 R, 260/398 S, 260/564 A, 260/565, 260/566 R

[51] Int. Cl. ............................................. C07d 85/26
[58] Field of Search ....................... 260/307.6, 307 F

[56] References Cited

UNITED STATES PATENTS 3,310,571   3/1967   Lambort ................... 260/307

*Primary Examiner*—Alex Mazel
*Assistant Examiner*—R. J. Gallagher
*Attorney*—Robert A. Gerlach and George W. Rauchfuss, Jr.

[57] ABSTRACT

Iminooxazolidines are prepared by reacting a guanidine compound with an alkylene oxide or an alkylene carbonate. The iminooxazolidines are useful as stabilizers for ester containing compositions.

11 Claims, No Drawings

METHOD FOR PREPARING IMINOOXAZOLIDINES FROM GUANIDINES

This application is a continuation-in-part of copending applications Ser. Nos. 402,951 filed Oct. 9, 1964 (now U.S. Pat. No. 3,594,387) and 544,683 filed Apr. 25, 1966 (now abandoned).

This invention relates to iminooxazolidines.

Heretofore it has been recognized in an article entitled "Anlagerungsrecktionen Mit Epoxyden" by Klaus Gulbins and Karl Hamann, Berichte, Volume 94, page 3,287 (1961) that the reaction of carbodiimides with an epoxide or an alkylene carbonate should be expected to result in the formation of oxazolidines. However, as pointed out by this article the synthesis of these iminooxazolidines has been unsuccessful due to the rearrangement and formation of cyclic ureas at the high temperatures necessary for the reaction.

Therefore, it is an object of this invention to provide a process for preparing 2-iminooxazolidines. It is a further object of this invention to provide a method for preparing N,N'-disubstituted iminooxazolidines from a guanidine.

The foregoing objects and others which will become apparent from the following description are accomplished in accordance with this invention, generally speaking, by providing organic iminooxazolidines having the following general formula

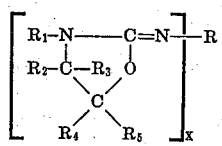

wherein R is the residue obtained after removing at least one NCO group from an organic isocyanate, $R_1$ is an organic group having from one to 20 carbon atoms, $R_2$, $R_3$, $R_4$ and $R_5$ which may be the same or different are hydrogen, halogen or organic groups having from one to 10 carbon atoms, and $x$ is an integer of from 1 to 3. Depending on the value of $x$, R is either mono-, di- or trifunctional and may be an alkyl, aryl, alkylene, alkenylene, and arylene group. In the above formula, $R_1$ is a hydrocarbon group having from one to 20 carbon atoms such as alkyl, aryl and cycloalkyl groups. Examples of representative alkyl groups are ethyl, n-propyl, isopropyl, n-butyl, isobutyl, sec.-butyl, tert.-butyl, n-pentyl and various positional isomers thereof such as, for example, 1-methylbutyl, 2-methylbutyl, 3-methylbutyl, 1,1-dimethylpropyl, 1,2-dimethylpropyl, 1-ethylpropyl and the like and the corresponding straight and brached chain isomers of hexyl, heptyl, octyl, nonyl, decyl, undecyl, dodecyl, tridecyl, pentadecyl, hexadecyl and the like. Examples of aryl radicals are phenyl, alpha-naphthyl, beta-naphthyl, alpha-anthryl, beta-anthryl, gamma-anthryl, o-tolyl, m-tolyl, p-tolyl, 2,3-xylyl, 2,4-xylyl, 2,5-xylyl, 2,6-xylyl, 3,4-xylyl, 3,5-xylyl, mesityl, o-ethylphenyl, m-ethylphenyl, p-ethylphenyl, m-,o-,and p 2,6-citertiarybutylphenyl, o-, and p-ethoxyphenyl, o-, m-, and p-tertiary butoxyphenyl and the like. Examples of cycloalkyl radicals which may be employed are cyclopropyl, cyclobutyl, cyclopentyl, cyclohexyl, 2-, 3-, or 4-isopropyl cyclohexyl, 2-, 3-, or 4-butyl cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclonondecyl, cycloeicosyl and the like. The radicals represented by $R_2$, $R_3$, $R_4$ and $R_5$ may be hydrogen atoms, halogen atoms or organic groups containing from one to 10 carbon atoms such as, for example, alkyl groups such as methyl, propyl, pentyl, hexyl, octyl and decyl and the like such as those recited above; aryl radicals such as phenyl, naphthyl, toluyl, xylyl, ethylphenyl and the like such as those recited above; cycloaliphatic radicals such as cyclobutyl, cyclopentyl, cyclohexyl and the like such as those recited above. In addition, $R_4$ represents a radical remaining after the removal of the 1,2-carbonate group from any suitable carbonate such as 1,2-butylene carbonate, 1,2-octylene carbonate, 1,2-decylene carbonate and the like.

Representative examples of the iminooxazolidines are 2-phenylimino-3-phenyloxazolidine, 2-methylimino-3-phenyloxazolidine, 2-ethylimino-3-phenyloxazolidine, 2-propylimino-3-phenyloxazolidine, 2-butylimino-3-phenyloxazolidine, 2-methylimino-3-methyloxazolidine, 2-methyliminoA3-propyloxazolidine, 2-phenylimino-3-propyl-5,5-dimethyloxazolidine, 2-phenylimino-3-propyl-5-ethyloxazolidine, 2-propylimino-3-propyl-5-propyloxazolidine, 2-phenylimino-3-propyl-5-propyloxazolidine and the like.

In accordance with the present invention the iminooxazolidines are prepared by a process which comprises reacting a carbodiimide with a secondary amine to form the guanidines and thereafter reacting the guanidines with an alkylene oxide or substituted alkylene oxide to form the corresponding iminooxazolidines. This reaction is illustrated by the following equations:

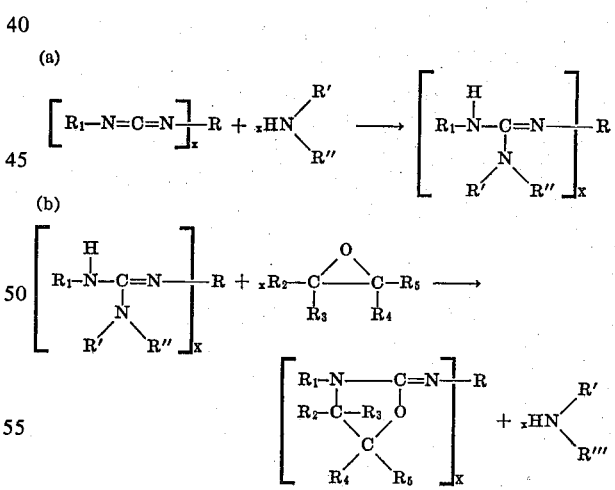

wherein R, $R_1$, $R_2$, $R_3$, $R_4$ and $R_5$ are the same as defined above and R' and R'' are organic groups having from one to 20 carbon atoms and $x$ is an integer equal to at least 1.

In the formation of the guanidines, the carbodiimide and the secondary amine are reacted at temperatures of from about 0° C. to about 200° C., preferably from about 40° to 150° C. in the presence or absence of a solvent. It is possible to use an excess of an amine which will function as a solvent in the formation of the guanidines. The pressure is not critical and may range from atmospheric up to about 5 atmospheres. Generally, the reaction is carried out in a dry vessel protected from atmospheric moisture at a temperature of about 40° C. Optionally, the reaction can be carried out at temperatures above 100° C. to shorten the time required to complete the reaction. Generally, the reaction is carried out with an amine to carbodiimide ratio of at least 2 to 1. It is preferred that the amine be used in excess of the 2:1 ratio and thus may be used as a solvent for the reactants. The excess amine may be removed by the conventional separation techniques, thereby providing for substantially pure guanidines.

Polymers having a plurality of carbodiimide linkages may be reacted with secondary amines to form a product having a plurality of guanidine linkages capped by suitable terminal groups, as illustrated by the formula

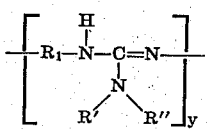

wherein $R_1$ is a bifunctional organic group, $R'$ and $R''$ are the same as defined above and $y$ is an integer equal to at least 2. These novel polymeric carbodiimides may be prepared by several general procedures involving the treatment of organic polyisocyanates such as described in U.S. Pat. No. 2,941,966. Any organic polyisocyanate may be used, including aliphatic, cycloaliphatic and aromatic types of any combination of these.

The guanidines thus formed are then reacted with alkylene oxides at a temperature in the range of from about 25° C. up to about 200° C., generally from 50° to 200° C., preferably from about 100° C. to about 150° C. in the presence of an inert solvent. The solvents which may be employed are dioxane, benzene, toluene, xylene and so forth. In carrying out this reaction, the guanidine and the alkylene oxide may be reacted at atmospheric pressure, however, it is preferred that the reaction be carried out at superatmospheric pressures. A catalyst is not essential in this reaction. However, basic catalysts such as trialkyl amines and alkali metal carbonates may be employed to increase the reaction rate. Examples of basic catalysts are trimethylamine, triethylamine, tributylamine, tripropylamine and alkali metal carbonates such as sodium carbonate, potassium carbonate, etc. The mol ratio of alkylene oxide to guanidine should be greater than 1:1 and even up to about 4:1, preferably from about 2.1:1 to about 2.5:1. The iminooxazolidines thus formed may be separated from the reaction mixture by the conventional separation techniques, such as, by distillation, crystallization and the like.

In general, the carbodiimides may be prepared by several different processes. For example, isocyanates may be heated in the presence of catalysts such as alkoxides, alkali carbonates, trialkyl amines, heavy metal salts of carboxylic acids such as lead octoate, tin octoate, cobalt naphthenate, dibutyl tin dilaurate, titanium tetrabutylate, iron acetylacetonate, and the like. In addition, they may be prepared by the metal oxide desulfurization of thioureas or by the sodium hypochlorite oxidation of thioureas. In addition, thioureas and ureas may be halogenated followed by dehydrohalogenation of the N,N'-disubstituted carbamic chloride. Another method for preparing carbodiimides involves desulfurization of thioureas with ethylchloroformate in the presence of a tertiary amine. Other methods for preparing carbodiimides are disclosed in U.S. Pat. Nos. 2,430,479; 2,654,680; 2,853,473; 2,941,966; 3,108,138; 3,135,348; 3,170,896 and 3,175,896.

Any suitable carbodiimide may be used in the practice of this invention, such as, for example, diisopropyl carbodiimide, dicyclohexyl carbodiimide, methyl-tert.-butyl carbodiimide, tert.-butylphenyl carbodiimide, N-dimethyl aminopropyl-tert.-butyl carbodiimide, diphenyl carbodiimide, dinaphthyl carbodiimide, 2,2'-dimethyldiphenyl carbodiimide, 2,2'-diisopropyldiphenyl carbodiimide, 2-dodecyl-2'-n-propyl-diphenyl carbodiimide, 2,2'-diethoxydiphenyl carbodiimide, 2-dodecyl-2'-ethyldiphenyl carbodiimide, 2,2'-dichlorodiphenyl carbodiimide, 2,2'-ditolyldiphenyl carbodiimide, 2,2'-dibenzyldiphenyl carbodiimide, 2,2'-dinitrodiphenyl carbodiimide, 2-ethyl-2'-isopropyldiphenyl carbodiimide, 2,6,2',6'-tetraethyldiphenyl carbodiimide, 2,6,2',6'-tetrasecondarybutyldiphenyl carbodiimide, 2,6,2',6'-tetraethyl-3,3'-dichlorodiphenyl carbodiimide, 2,6,2',6'-tetraisopropyl-3,3'-dinitrodiphenyl carbodiimide, 2-ethylcyclohexyl-2-isopropylphenyl carbodiimide, 2,4,6,2',4',6'-hexylisopropyldiphenyl carbodiimide, 2,2'-diethyldicyclophexyl carbodiimide, 2,6,2',6'-tetraisopropylcyclohexyl carbodiimide, 2,6,2',6'-tetraethyldicyclohexyl carbodiimide, 2,2'-dichlorodicyclohexyl carbodiimide, 2,2'-dicarboethoxydiphenyl carbodiimide, and the like. Any suitable carbodiimide having more than one carbodiimide group may also be used such as those described in U.S. Pat. No. 2,941,966.

Any suitable secondary amine may be used to prepare the guanidines, such as, for example, dimethyl amine, diethyl amine, di-n-propyl amine, diisopropyl amine, di-n-butyl amine, diisobutyl amine, di-sec-butyl amine, di-n-amyl amine, diisoamyl amine, dicyclohexyl amine, diphenyl amine, phenyl-alpha-naphthyl amine, phenyl-beta-naphthyl amine, monomethyl aniline, monoethyl aniline, methylethyl amine, methylpropyl amine, ethylpropyl amine, ethylbutyl amine, and the like.

Any suitable alkylene oxide having the following structural formula may be used in the reaction with guanidines

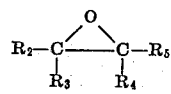

wherein $R_2$, $R_3$, $R_4$ and $R_5$ which may be the same or different are hydrogen, halogen, or organic groups having from one to 10 carbon atoms as set forth before.

Examples of suitable alkylene oxides are ethylene oxide, 1,2-propylene oxide, 1,2-butylene oxide, 1,2-amylene oxide, cyclohexylene oxide, 1,2-octylene oxide, 3-ethyl-1,2-pentylene oxide, phenyl glycidyl ether, amyl glycidyl ether, tolyl glycidyl ether, chlorophenyl glycidyl ether, styrene oxide and the like. It is preferred that 1,2-alkylene oxides be used in the reaction with guanidines. Preferably the alkylene oxide has from two to eight carbon atoms.

In the presence of an alkaline catalyst, a suitable alkylene carbonate having from two to 10 carbon atoms in the alkylene group may be substituted for the alkylene oxide. Examples of suitable alkylene carbonates are ethylene carbonate, butylene carbonate, hexylene carbonate, octylene carbonate, decylene carbonate and the like.

These 2-iminooxazolidines are particularly useful as stabilizers for ester containing compositions. In the event that the ester or polyester is reacted with other compounds, such as, for example, organic polyisocyanates, to form polyurethanes, the 2-iminooxazolidines can be added after this reaction occurs. The addition can be made with the oxazolidines in the dissolved state by rolling, milling, stirring or any other suitable technique.

Any composition containing ester linkages

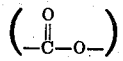

may be stabilized against hydrolytic degradation in accordance with this invention such as, for example, the reaction product of a carboxylic acid with an alcohol. Any suitable carboxylic acid may be used in the preparation of compositions containing ester groups in accordance with this invention such as, for example, acetic acid, propionic acid, phenyl acetic acid, benzoyl acetic acid, pyruvic acid, propionyl acetic acid, butyryl formic acid, aceto butyric acid, levulinic acid, 1,2-keto stearic acid, 1,3-keto behenic acid, aldovaleric acid, hexahydrobenzoic acid, 1,2-cyclohexanone carboxylic acid, brassylic acid, phenylmalonic acid, ethylglycollic acid, thiodiglycollic acid, β-chloro-propionic acid, glutaconic acid, ethoxymalonic acid, malic acid, aspartic acid, acrylic acid, methacrylic acid, cinnamic acid, benzene tricarboxylic acid, adipic acid, succinic acid, suberic acid, sebacic acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaconic acid and the like.

Any suitable alcohol may be used in the preparation of esters such as, for example, methyl alcohol, ethyl alcohol, propyl alcohol, isopropyl alcohol, n-butyl alcohol, isobutyl alcohol, secondary butyl alcohol, tertiary butyl alcohol, amyl alcohol, hexyl alcohol, octyl alcohol, decyl alcohol, lauryl alcohol, myristyl alcohol, cetyl alcohol, stearyl alcohol, allyl alcohol, methally alcohol, crotyl alcohol, 2-propyn-1-ol, oleyl alcohol, geraniol, citronellol, linalool, diacetone alcohol, ethylene glycol monoethyl ether, cyclohexanol, naphthenic alcohols, benzyl alcohol, tolyl alcohol, phenylethyl alcohol, octadecylbenzyl alcohol, ethylene glycol, propylene glycol, 1,4-butanediol, 1,3-butanediol, 1,5-pentanediol, 1,6-hexanediol, bis-(hydroxy methyl cyclohexane), diethylene glycol, 2,2-dimethyl propylene glycol, 1,3,6-hexanetriol, trimethylol propane, pentaerythritol, sorbitol, glycerine and the like. The method of stabilizing compositions containing ester groups is applicable not only to monoesters but also to polyesters in accordance with the compounds listed above having a functionality greater than 1. For example, where any of the di- or polycarboxylic acids are reacted with the di- or polyhydric alcohols, a polyester having more than one ester group, of course, will result.

Of course, other compositions containing polyester resins as a reaction component or in admixture can also be stabilized by the process of this invention. For example, compositions such as polyester amides and polyester urethanes can be stabilized. The reaction product of any of the carboxy terminated or hydroxyl terminated esters set forth above can be reacted with a suitable isocyanate to prepare a polyurethane. In the preparation of polyesteramides, the reaction of a carboxylic acid, an alcohol and an amine can be carried out simultaneously or in steps in the manner set forth for the preparation of polyesteramides. Of course, aminoalcohols and amino acids can be used in the preparation of polyesteramides. The pertinent feature is, however, that any composition containing ester groups can be stabilized against hydrolysis by the introduction thereof of an oxazolidine within the formula set forth above.

Any suitable organic polyisocyanate may be used to prepare polyester urethanes which may be stabilized in accordance with the invention such as, for example, those referred to hereinbefore.

Any suitable amino compound can be used to prepare polyesteramides such as, for example, hexamethylene diamine, ethylene diamine, propylene diamine, butylene diamine, cyclohexylene diamine, phenylene diamine, tolyene diamine, xylylene diamine, 4,4'-diamino-diphenylmethane, naphthylene diamine, aminoethyl alcohol, aminopropyl alcohol, aminobutyl mutton tallow, beef tallow, neat's foot oil, palm oil, peanut oil, carnauba wax, spermaceti, beeswax, rapeseed oil, alcohol, aminobenzyl alcohol, aminoacetic acid, aminopropionic acid, aminobutyric acid, aminovaleric acid, aminophthalic acid, aminobenzoic acid and the like. Of course, the amino compounds may be reacted either simultaneously with the ester forming components or sequentially therewith.

It is also within the scope of the invention that naturally occurring esters may be stabilized against hydrolysis and aging in accordance with this invention such as, for example, castor oil, cocoanut oil, corn oil, cottonseed oil, horse fat oil, lard oil, wool fat, japan wax, mutton tallow; beef tallow; neat's foot oil; palm oil; peanut oil; carnauba wax; spermaceti; beeswax; rapeseed oil; soya bean oil, whale oil, sperm oil and the like. Further, any compositions containing ester groups as well as unsaturation may be stabilized in accordance with this invention. Such compositions may be formed by polymerization, condensation or a combination of both. Any of those unsaturated carboxylic acids mentioned above may be used in the preparation of such polyesters. Further examples of such compositions include polyester resins of polymerizable monomers and unsaturated polyesters, for example, those of fumaric or maleic acid as well as ethylene vinyl ester copolymers, acrylic and methacrylic acid ester polymers and their copolymers with vinyl esters, fluorinated acrylic esters and their copolymers, copolymers of acrylonitrile and acrylic acid esters such as methylacrylate and the like. The invention is particularly applicable to the stabilization of polyesters used in the manufacture of synthetic resins which may result in the form of lacquers, foils and coatings, fibers, foam materials, elastomers or casting resins for molded elements.

Any of the 2-imino-oxazolidines within the generic formula set forth above may be used to stabilize any of the polyester compositions set forth. The oxazolidines should be used in a stabilizing amount, however, it is generally preferred that from about 0.1 to about 10 parts per 100 parts of a polyester be used.

The oxazolidines may be incorporated into the polyester by any suitable technique which includes dry blending, dissolving in the polyester itself, dissolving in a co-reactant before reaction with the polyester and the like.

The invention is further illustrated but not limited by the following examples in which all parts and percentages are by weight unless otherwise specified.

EXAMPLE 1

Preparation of N,N-di-n-propyl-N',N''-diphenyl guanidine

About 48.3 parts of diphenyl carbodiimide are slowly added to about 101 parts of di-n-propyl amine with stirring while maintaining the reaction at a temperature of from about 35° to about 40° C. After the carbodiimide addition is complete, stirring is continued for about two hours. The excess di-n-propylamine is removed by distillation in vacuo leaving as residue N,N-di-n-propyl-N',N''-diphenyl guanidine.

EXAMPLE 2

Preparation of 2-phenylimino-3-phenyl oxazolidine

To a 1-liter stirred autoclave is added about 46.5 parts of N,N-di-n-propyl-N',N''-diphenyl guanidine, about 14.6 parts of triethylamine, about 207 parts of dioxane and about 36 parts of ethylene oxide. The mixture is heated to a temperature of from about 120° C. to about 145° C. for about three hours, at which time no guanidine is detected in the reaction mixture. The amines and dioxane are removed by distillation, and a residue of about 34.5 parts of crude 2-phenylimino-3-phenyl oxazolidine remains, which amounts to a 91.7 percent yield, based on the guanidine charged. The residue is recrystallized from isopropanol, yielding white crystals having a melting point of 115.8° to 116.6° C. Mixed melting point with authentic 2-phenylimino-3-phenyl oxazolidine is 115.9° to 116.6° C. (Melting point authentic material = 115.9° to 116.6 C.).

EXAMPLE 3

Preparation of a compound having the formula

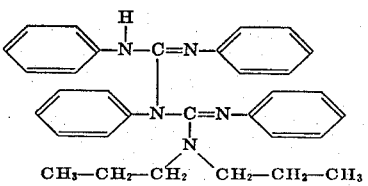

To about 388 parts (2mols) of diphenyl carbodiimide in about 207 parts of dioxane is slowly added, with agitation, about 101 parts (1 mol) of di-n-propyl amine, while maintaining the reaction temperature between about 68° C. and 71° C. When the addition of di-n-propyl amine is complete, the reaction mixture is analyzed on the infra-red spectrum. Additional amine produced no further heat of reaction, and the infra-red spectrum showed no carbodiimide to be present in the reaction mixture.

EXAMPLE 4

About 173 parts of the dioxane solution of Example 3, 207 parts of dioxane, 18.3 parts of triethylamine and 70 parts of ethylene oxide are added to a 1-liter autoclave equipped with an agitator. The mixture is heated with agitation to a temperature of from about 128° C. to about 144° C. for about 4 hours. At the end of this time no unreacted guanidine is present in the reaction mixture. After removing the dioxane and most of the amine by distillation in vacuo, approximately 131.9 parts of a dark residue is recovered. Methyl alcohol is added to the crude product and the mixture filtered. A residue of about 78.6 parts is recovered which is identified as 2-phenylimino-3-phenyloxazolidine. This residue is recrystallized from isopropanol, yielding white crystals which melt at a temperature of 115.8° C. to 116.6° C. When these crystals are combined with authentic 2-phenylimino-3-phenyloxazolidine (melting point between 115.9° C. and 116.6° C.), the combined crystalline product melts at a temperature of 115.9° to 116.6° C.

EXAMPLE 5

Preparation of N,N-dimethyl-N',N''-diphenyl guanidine

To approximately 45.1 parts of dimethylamine dissolved in 200 parts of dioxane are slowly added about 48.3 parts of diphenyl carbodiimide with agitation, while maintaining the reaction temperature between about 35° and 40° C. After the cabodiimide addition is complete, stirring is continued for an additional 2 hours. The excess dimethylamine is stripped and dioxane is removed by distillation leaving a residue of N,N-dimethyl-N',N''-diphenyl guanidine.

EXAMPLE 6

Preparation of 2-phenylimino-3-phenyloxazolidine

To a 1-liter stirred autoclave is added about 38 parts of N,N-dimethyl-N',N''-diphenyl guanidine, 14.6 parts of triethylamine, 207 parts of dioxane, and 36 parts of ethylene oxide. The mixture is heated to a temperature between about 120° C. and 145° C. for a period of bout 3 hours at which time no guanidine was detected in the reaction mixture. The amines and dioxane are removed from the reaction mixture by distillation. About 34 parts of a crude product is recovered. Recrystallized from isopropanol gave white crystals having a melting point between 115.8° C. and 116.6° C. These crystals are mixed with authentic 2-phenylimino-3-phenyloxazolidine and gave a melting point between about 115.9° C. and 116.6° C.

Other guanidines, such as, for example, N,N-diphenyl-N',N''-diphenyl guanidine, N,N-diethyl-N',N''-diphenyl guanidine, N,N-diphenyl-N',N''-dinaphthyl guanidine and the like may be prepared in accordance with the procedure described in Example 5.

EXAMPLE 7

In accordance with the procedure described in Example 6, N,N-diphenyl-N',N''-diphenyl guanidine is reacted with ethylene oxide. The product thus recovered is identified by infra-red analysis as 2-phenylimino-3-phenyloxazoline.

EXAMPLE 8

Example 6 is repeated except N,N-di-n-propyl-N',N''-diisobutyl guanidine is reacted with ethylene oxide. The product is identified as 2-isobutylimino-3-isobutyloxazolidine.

EXAMPLE 9

Preparation of Iminooxazolidines Polymer of Toluylene Carbodiimide

Approximately 30 parts of a poly(2,4-tolylene carbodiimide) prepared in accordance with U.S. Pat. No. 2,941,966 is dissolved in tetrahydrofuran and introduced with agitation into a stirred reaction flask containing about 300 parts of diethylamine dissolved in tetrahydrofuran, while maintaining the reaction temperature between about 70° and 80° C. After the carbodiimide reaction is complete, agitation is continued for an additional 2 hours. The unreacted diethylamine is removed by distillation and the residue identified as a polymer consisting of repeating guanidine units.

To a 1-liter autoclave equipped with an agitator is added about 20 parts of the guanidine polymer prepared above, 20 parts of triethylamine, 200 parts of tetrahydrofuran and about 40 parts of ethylene oxide. The mixture is heated to a temperature of between about 160° C. and 180° C. for a period of about 3 hours. At the end of this time, the amines and tetrahydrofuran are removed by distillation, leaving a residue identified by the infra-red spectrum as a polymer consisting of repeating iminooxazolidine units.

EXAMPLE 10

Preparation of 2-phenylimino-3-phenyl-5-methyloxazolidine

To a 1-liter stirred autoclave is added about 46.5 parts of N,N-di-n-propyl-N',N''-diphenyl guanidine (prepared in accordance with Example 1) about 14.6 parts of triethylamine, 207 parts of dioxane and 47.6 parts of propylene oxide. The mixture is heated to a temperature of from about 140° to about 160° C. for a period of about 4 hours. At the end of this time no guanidine was detected in the reaction mixture. The amines and dioxane are removed by distillation. A residue is recovered which upon recrystallization from isopropanol, is identified as 2-phenylimino-3-phenyl-5-methyloxazolidine.

EXAMPLE 11

Preparation of 2-phenylimino-3,5-diphenyloxazolidine

To a 1-liter autoclave equipped with an agitator is added about 46.5 parts of N,N-di-n-propyl-N',N''-diphenyl guanidine (prepared in accordance with Example 1), 14.6 parts of triethylamine, 207 parts of dioxane and 98.5 parts of styrene oxide. The mixture is heated to a temperature between about 140° and 160° C. for about 4 hours. At the end of this time no guanidine was detected in the reaction mixture. The amines and dioxane are removed by distillation. The residue is recovered, analyzed and identified as 2-phenylimino-3,5-diphenyloxazolidine.

EXAMPLE 12

Preparation of 2-phenylimino-3-phenyl-5,5-dimethyloxazolidine

To a 1-liter autoclave equipped with a stirrer is added about 46.5 parts of N,N-di-n-propyl-N',N''-diphenyl guanidine, 14.6 parts of triethylamine, 207 parts of dioxane and 59 parts of isobutylene oxide. The mixture is heated to a temperature of between about 150° and 170° C. for a period of about 4 hours. At the end of this time no guanidine is detected in the reaction mixture. The amines and dioxane are removed by distillation and a residue recovered which is identified as 2-phenylimino-3-phenyl-5,5-dimethyloxazolidine.

EXAMPLE 13

Stabilization of a Polyester

About 1 part of the product of Example 2 is dissolved in about 100 parts of a hydroxyl polyester having a molecular weight of about 2,000 and an hydroxyl number of about 57 which is prepared by reacting adipic acid with diethylene glycol and trimethylol propane. About 10 parts of an isomeric mixture of 80 percent 2,4- and 20 percent 2,6-tolylene diisocyanate is stirred into this mixture and this reaction mixture is then cast onto a Teflon coated tray to a thickness of about one-eighth where it is permitted to remain for about 2 hours at about 110° C.

Identical samples are prepared without the addition of the product of Example 2. Samples having the additive and those without the additive are placed on a wire screen over a steam bath at 100° C. The unmodified samples soften after 72 hours and completely failed after 105 hours. Those containing the additive in accordance with this invention do not soften until 144 hours of exposure.

EXAMPLE 14

To about 150 parts of the polyester of Example 13 are added 1.35 parts of a compound having the formula

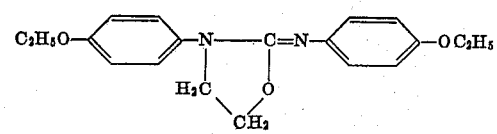

About 100 parts of this mixture are reacted with about 10 parts of an isomeric mixture of 80 percent 2,4- and 20 percent 2,6-tolylene diisocyanate. The reaction mixture, which is one typically used in the preparation of printing rollers, is cast into a test sample. The test sample is subjected to saturated steam at 100° C. This sample failed after 144 hours. In comparison, a similar sample containing none of the additive set forth above failed after 96 hours.

EXAMPLE 15

The procedure of Example 14 is followed with the exception that 4.05 parts of the compound having the formula represented are added to the polyester in place of the 1.35 parts of Example 14. The test sample prepared using this stabilized polyester exhibits no signs of failure even after 144 hours on a steam bath.

EXAMPLE 16

To about 100 parts of the polyester of Example 13 are added the amounts of the compounds indicated in the accompanying table. This mixture is then reacted with 10 parts of an isomeric mixture of 80 percent 2,4- and 20 percent 2,6-tolylene diisocyanate to prepare a typical printing roller formulation. The reaction mixture is then cast onto a plate and the solidified material is subjected to saturated steam at about 100° C. for the time indicated in the table.

The value for $R$, $R_1$ and $R_4$ are indicated in the table in order to specifically identify the compounds used.

| R, R$_1$ | R$_4$ | Parts | Hours to Failure |
|---|---|---|---|
| C$_6$H$_5$— | H | 0.658 | 114 |
| C$_6$H$_5$ | H | 1.974 | 240 |
| C$_6$H$_5$ | CH$_3$ | 1.00 | 130 |
| P-EToC$_6$H$_4$ | H | 0.934 | 144 |
| | Control (No additive) | | |

EXAMPLE 18

To about 100 parts of an hydroxyl terminated polyester prepared by reacting 10 mols of adipic acid and 11 mols of 1,4-butanediol to an hydroxyl number of 56 and an acid number less than one are added 9 parts of 1,4-butanediol and about 40 parts of 4,4'-diphenylmethane diisocyanate. The reaction mixture is immediately cast onto a heated plate maintained at a temperature of about 110° C. where it is permitted to solidify. Upon solidification, the material is removed from the plate and tested for elongation, elongation set, tensile and tear strength. The sample is then subjected to steam at 15 lb/sq. inch gauge for a period of 16 hours and then, the samples are again tested. To each of three 100 part samples of the polyester reacted as above, are added the quantities of the compound of Example 2 indicated in the table. The test data both before and after the steam test are set forth.

| Compound | Parts | Hours to failure |
|---|---|---|
| (structure 1) | 0.669 | 114 |
| (structure 2) | 2.007 | 216 |
| (structure 3) | 1.10 | 168 |
| (¹) | | 96 |

¹ Control (no additive).

EXAMPLE 17

The procedure of Example 13 is followed with the exception that a compound indicated in the following table is added to the polyester in the amounts set forth. The casting in each case is then subjected to saturated steam at 100° C. until failure. The compounds added have the general formula:

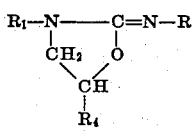

| Parts/100 Parts — Poly-ester | Elongation | | Elongation Set | | Tensile | | Tear | |
|---|---|---|---|---|---|---|---|---|
| | Before | after | Before | after | Before | after | Before | after |
| — | 500 | 560 | 10 | 140 | 7890 | 3560 | 245 | 220 |
| 0.67 | 490 | 560 | 10 | 77 | 7680 | 4270 | 216 | 277 |
| 1.349 | 500 | 600 | 20 | 115 | 7620 | 4280 | 288 | 261 |
| 2.02 | 540 | 600 | 40 | 117 | 8000 | 4260 | 295 | 214 |

It is of course to be understood that any of the 2-iminooxazolidines mentioned above may be used in the stabilization of any of the polyesters set forth above.

Although the invention has been described in considerable detail in the foregoing for the purpose of illustration, it is to be understood that such detail is solely for this purpose and that variations can be made by those skilled in the art without departing from the spirit and scope of the invention.

What is claimed is:

1. A method for preparing an iminooxazolidine wherein 1 mol of a guanidine compound is reacted with from 1 to 4 mols of a member selected from the group consisting of 1,2-alkylene oxides and alkylene carbonates in the presence of an inert organic solvent and a basic catalyst selected from the group consisting of trialkyl amines and alkali metal carbonates at a temperature of from about 25° C. to about 200° C. to form an iminooxazolidine having the formula

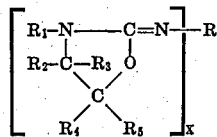

wherein R is a mono-, di- or trifunctional alkyl, phenyl, alkylene, alkenylene or phenylene radical containing from one to 15 carbon atoms, $R_1$ is an organic radical containing from one to 20 carbon atoms selected from the group consisting of alkyl, cycloalkyl and phenyl; $R_2$, $R_3$, $R_4$ and $R_5$ are radicals selected from the group consisting of hydrogen atoms, halogen and organic radicals containing one to 10 carbon atoms selected from the group consisting of alkyl, cycloalkyl and phenyl; and $x$ is an integer of from 1 to 3.

2. The method of claim 1 wherein the reaction is conducted at a temperature of from 100° to 150° C.

3. The method of claim 1 wherein from about 2.1 mols to about 2.5 mols of alkylene oxide are reacted per mol of guanidine compound.

4. The method of claim 1 wherein R and $R_1$ are phenyl radicals, $R_2$ and $R_3$ are hydrogen atoms, $R_4$ and $R_5$ are alkyl radicals and $x$ is 1.

5. The method of claim 1 wherein R and $R_1$ are phenyl radicals, $R_2$, $R_3$, $R_4$ and $R_5$ are hydrogen atoms and $x$ is 1.

6. The method of claim 1 wherein N,N-di-n-propyl-N', N''-diphenyl guanidine is reacted with ethylene oxide at a temperature between about 120° C. and 145° C. in the presence of triethylamine and dioxane to form an iminooxazolidine having the formula

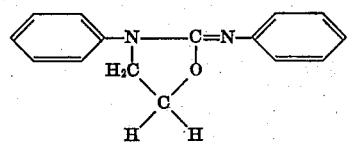

7. The method of claim 1 wherein N,N-dimethyl-N',N''-diphenyl guanidine is reacted with ethylene oxide at a temperature between about 120° C. and 145° C. in the presence of triethylamine and dioxane to form 2-phenylimino-3-phenyloxazolidine.

8. The method of claim 1 wherein N,N-di-n-propyl-N',N''-diisobutyl guanidine is reacted with ethylene oxide at a temperature between about 120° C. and 145° C. in the presence of triethylamine and dioxane to form 2-isobutylimino-3-isobutyloxazolidine.

9. The method of claim 1 wherein N,N-di-*n*-propyl-N',N''-diphenyl guanidine is reacted with styrene oxide at a temperature between 140° C. and 160° C. in the presence of triethylamine and dioxane to form 2-phenylimino-3,5-diphenyloxazolidine.

10. The method of claim 1 wherein N,N-di-n-propyl-N',N''-diphenyl guanidine is reacted with propylene oxide at a temperature between 140° C. and 160° C. to form 2-phenylimino-3-phenyl-5-methyloxazolidine.

11. The method of claim 1 wherein N,N-di-n-propyl-N',N''-diphenyl guanidine is reacted with isobutylene oxide at a temperature between 150° C. and 170° C. in the presence of triethylamine and dioxane to form 2-phenylimino-3-phenyl-5,5-dimethyloxazolidine.

* * * * *

UNITED STATES PATENT OFFICE

CERTIFICATE OF CORRECTION

Patent No. 3,689,499            Dated: September 5, 1972

Sidney H. Metzger, Jr.

It is certified that error appears in the above-identified patent and that said Letters Patent is hereby corrected as shown below:

Insert on page 1 - [73] Assignee: Baychem Corporation
New York, New York

Signed and sealed this 6th day of March 1973.

(SEAL)
Attest:

EDWARD M. FLETCHER, JR.            ROBERT GOTTSCHALK
Attesting Officer            Commissioner of Patents